UNITED STATES PATENT OFFICE.

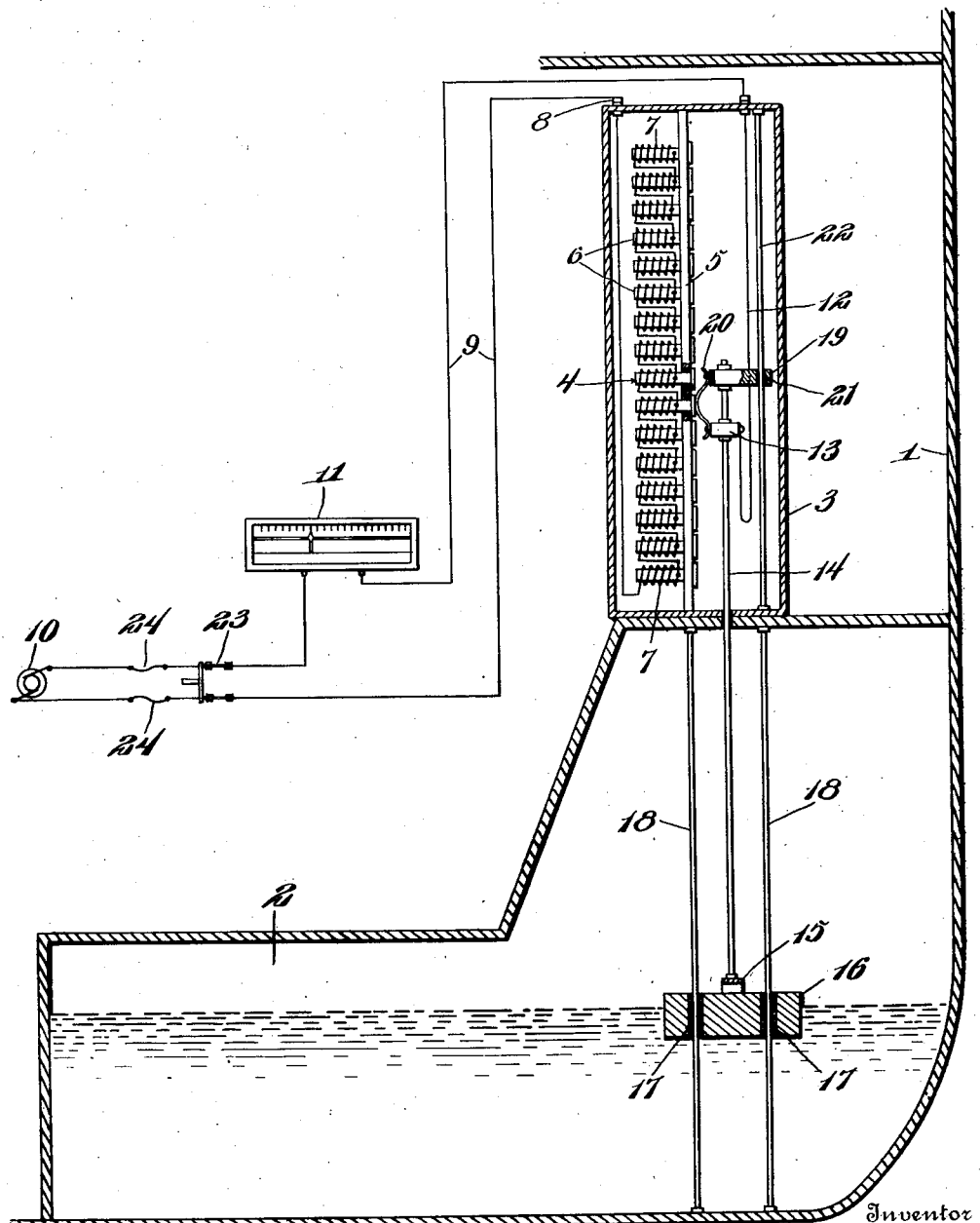

LAWRENCE S. LARSON, OF TOLEDO, OHIO.

INDICATOR.

1,081,843.  Specification of Letters Patent.  Patented Dec. 16, 1913.

Application filed March 11, 1913. Serial No. 753,559.

*To all whom it may concern:*

Be it known that I, LAWRENCE S. LARSON, a citizen of the United States, residing at Toledo, in the county of Lucas and State of Ohio, have invented new and useful Improvements in Indicators, of which the following is a specification.

This invention relates to indicators and more particularly to devices for showing the amount of water in ballast tanks of vessels.

Heretofore the method of determining the amount of ballast in the ballast tanks was to insert a rod in a tube into the ballast tank and measure the amount of water in this manner. This necessitated considerable time and trouble and it is the object of the present invention to avoid these difficulties, and broadly speaking, to provide a device which will automatically indicate to the engineer the amount of water in the ballast tanks without having to move from his position in the engine room.

A further object of the invention is the provision of an indicator in which an electric circuit is used, having a plurality of resistance elements therein adapted to be successively cut in as the water rises in the tank so that when there is no water in the tank the maximum voltage will pass through the volt meter and be gradually decreased, as the resistance is cut into the circuit by mechanism actuated by the rise of the water in the ballast tank.

Further objects of the invention will appear as the following specific description is read in connection with the accompanying drawing which forms a part of this application, and, in which the figure is a diagrammatic view showing a cross section of the ship's ballast tank and the connection between the sliding contact and the float.

Referring more particularly to the drawing, 1 represents the side of a ship and 2 a ballast tank contained within the ship and having mounted thereon a casing 3 in which the resistance element 4 is mounted. This resistance element comprises a stationary metallic plate 5 having a plurality of contact pins 6 projecting therethrough and electrically insulated therefrom, as will be readily seen from the sectioned portion of the resistance element. These pins are wound with a predetermined amount of any suitable resistance wire shown at 7, so as to form resistance coils which are connected in series from the bottom to the top of the plate 5, as shown. The lower coil is connected to one terminal 8 of an electrical circuit 9 which includes a source of current 10 and a volt meter 11. The opposite terminal of the circuit is connected through a flexible pig tail 12 to a sliding block 13 of insulating material. This block is mounted adjacent the upper end of a connecting rod 14, whose lower end is secured in a yoke 15 formed on the float 16. The float is constructed of any suitable material and is provided with tubes 17 passing therethrough, which surrounds the guide rods 18 extending from the bottom to the top of the tank in parallel relation, as shown. The upper end of the connecting rod 14 has secured to it a guiding block 19 of metal and connecting the blocks 13 and 19 is a contact spring 20 which is adapted to wipe over the exposed ends of the pins 6, where they project through said plate. The block 19 is provided with an aperture 21 to receive a guide rod 22 extending between the top and the bottom of the casing 3 in parallel relation with the plate 5 so that the block 19 is prevented from turning and the spring 20 is held in engagement with the pin 6 with equal pressure throughout its movement.

The volt meter 11 which is of ordinary construction has its dial preferably changed so as to read in foot inches instead of volts and each coil is made to reduce the voltage one volt. As these coils or their contact pins are preferably spaced two inches apart the volt meter should read two inches for every volt. The circuit includes a suitable controlling switch 23 and suitable fuses 24.

What I claim is:

1. In a ship's ballast indicator, the combination with a ballast tank, of a float vertically movable therein, an electrical circuit including a volt meter, a bank of resistance elements serially connected to one terminal of the circuit, a contact member rigidly connected to and actuated by the float, a flexible connection between the opposite terminal of the circuit and the contact members and means to insure engagement of the contact member with one resistance element at all times.

2. In a ship's ballast indicator, the combination with a ballast tank, of a casing mounted thereon, a float operating within the tank, an electrical circuit including a source of current and a volt meter, a bank of resistance elements mounted in the casing and connected in series with one terminal of the circuit, a sliding contact spring arranged in the casing and connected to the opposite terminal of the circuit, a rigid connection between the float and the contact spring for operating the latter over the bank of resistance elements, means for guiding the float and means for guiding the contact spring.

In testimony whereof I affix my signature in presence of two witnesses.

LAWRENCE S. LARSON.

Witnesses:
D. W. CONGER,
R. E. BERRY.